US011411890B2

(12) United States Patent
Zahid et al.

(10) Patent No.: US 11,411,890 B2
(45) Date of Patent: *Aug. 9, 2022

(54) SYSTEM AND METHOD FOR SUPPORTING EFFICIENT LOAD-BALANCING IN A HIGH PERFORMANCE COMPUTING (HPC) ENVIRONMENT

(71) Applicant: Oracle International Corporation, Redwood Shores, CA (US)

(72) Inventors: Feroz Zahid, Oslo (NO); Ernst Gunnar Gran, Oslo (NO); Bartosz Bogdanski, Oslo (NO); Bjørn Dag Johnsen, Oslo (NO)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/486,627

(22) Filed: Sep. 27, 2021

(65) Prior Publication Data
US 2022/0014484 A1   Jan. 13, 2022

Related U.S. Application Data

(63) Continuation of application No. 16/502,607, filed on Jul. 3, 2019, now Pat. No. 11,159,452, which is a (Continued)

(51) Int. Cl.
*H04L 49/25*   (2022.01)
*H04L 47/125*  (2022.01)
(Continued)

(52) U.S. Cl.
CPC ............. *H04L 49/25* (2013.01); *H04L 45/48* (2013.01); *H04L 47/125* (2013.01); *H04L 67/1002* (2013.01)

(58) Field of Classification Search
CPC ....... H04L 49/25; H04L 45/48; H04L 47/125; H04L 67/1002
(Continued)

(56) References Cited

U.S. PATENT DOCUMENTS

| 5,138,615 A | 8/1992 | Lamport et al. |
| 7,761,629 B2 | 7/2010 | Butler et al. |

(Continued)

FOREIGN PATENT DOCUMENTS

| CN | 102164081 | 8/2011 |
| CN | 103026668 | 4/2013 |

(Continued)

OTHER PUBLICATIONS

Antelo, Elisardo; "A Comment on Beyond Fat-tree: Unidirectional Load-Balanced Multistage Interconnection Network", IEEE Computer Architecture Letters, vol. 8, No. 1, Jan.-Jun. 2009, 2 pages.
(Continued)

*Primary Examiner* — Zi Ye
(74) *Attorney, Agent, or Firm* — Tucker Ellis LLP

(57) ABSTRACT

Methods and systems for supporting efficient load balancing among a plurality of switches and a plurality of end nodes arranged in a tree topology in a network environment. The methods and systems can sort the plurality of end nodes, wherein the plurality of end nodes are sorted in a decreasing order of a receive weight. The method and system may further route, in the decreasing order of receive weights, the plurality of end nodes, wherein the routing comprises selecting at least one down-going port and at least one up-going port. Further, the method and system can increase an accumulated downward weight on each selected down-going port by the receive weight of the routed end node, and increase an accumulated upward weight on each selected up-going port by the receive weight of the routed end node.

20 Claims, 7 Drawing Sheets

Related U.S. Application Data continuation of application No. 15/845,773, filed on Dec. 18, 2017, now Pat. No. 10,374,979, which is a continuation of application No. 14/792,070, filed on Jul. 6, 2015, now Pat. No. 9,876,737.

(60) Provisional application No. 62/049,466, filed on Sep. 12, 2014, provisional application No. 62/023,321, filed on Jul. 11, 2014.

(51) Int. Cl.
*H04L 45/48* (2022.01)
*H04L 67/1001* (2022.01)

(58) Field of Classification Search
USPC .......................................................... 709/226
See application file for complete search history.

(56) References Cited

U.S. PATENT DOCUMENTS

| | | | |
|---|---|---|---|
| 8,879,396 | B2 | 11/2014 | Guay et al. |
| 9,461,915 | B1 | 10/2016 | Zhou et al. |
| 9,559,919 | B2 * | 1/2017 | Bhetanabhotla ...... H04L 43/045 |
| 11,159,452 | B2 * | 10/2021 | Zahid ...................... H04L 45/48 |
| 2003/0133410 | A1 | 7/2003 | Kang et al. |
| 2003/0156552 | A1 * | 8/2003 | Banker ................. H04L 41/046 |
| | | | 370/266 |
| 2011/0273987 | A1 | 11/2011 | Schlansker et al. |
| 2013/0070647 | A1 | 3/2013 | Dugue et al. |
| 2013/0121149 | A1 * | 5/2013 | Guay ...................... H04L 47/12 |
| | | | 370/231 |
| 2013/0121154 | A1 | 5/2013 | Guay et al. |

FOREIGN PATENT DOCUMENTS

| | | |
|---|---|---|
| CN | 103560967 | 2/2014 |
| CN | 103907321 | 7/2014 |
| EP | 2662778 | 11/2013 |
| JP | 2013531424 | 8/2013 |
| JP | 2015169987 | 9/2015 |
| WO | 2014003534 | 1/2014 |

OTHER PUBLICATIONS

Bogdanski, et al., "Multi-homed fat-tree routing with InfiniBand", 2014 22nd Euromicro International Conference on Parallel, Distributed, and Network-Based Processing, pp. 122-129, 8 pages.

Gomez, et al. "RUFT: Simplifying the Fat-tree Topology", 2008 14th IEEE International Conference on Parallel and Distributed Systems, pp. 153-160, 8 pages.

Guay, et al., "vFtree—A Fat-tree Routing Algorithm using Virtual Lanes to Alleviate Congestion", 2011 IEEE International Parallel & Distributed Processing Symposium, pp. 197-208, 12 pages.

Meng, et al. "Improving the Scalability of Data Center Networks with Traffic-aware Virtual Machine Placement", IEEE INFOCOM 2010, 9 pages.

"OpenFlow Switch Specification", Version 1.3.1 (Wire Protocol 0x04), Open Networking Foundation, Sep. 6, 2012, 128 pages.

Korean Intellectual Property Office, Notice of Office Action dated Oct. 5, 2021 for Korean Patent Application No. 10-2017-7003836, 13 pages.

The Korean Intellectual Property Office, Allowance of Patent dated Feb. 14, 2022 for Korean Patent Application No. 10-2017-7003836, 3 pages.

\* cited by examiner

SYSTEM AND METHOD FOR SUPPORTING EFFICIENT LOAD-BALANCING IN A HIGH PERFORMANCE COMPUTING (HPC) ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY

This application is a continuation of U.S. patent application titled "SYSTEM AND METHOD FOR SUPPORTING EFFICIENT LOAD-BALANCING IN A HIGH PERFORMANCE COMPUTING (HPC) ENVIRONMENT", application Ser. No. 16/502,607, filed Jul. 3, 2019 which is a continuation of and claims priority to U.S. patent application titled "SYSTEM AND METHOD FOR SUPPORTING EFFICIENT LOAD-BALANCING IN A HIGH PERFORMANCE COMPUTING (HPC) ENVIRONMENT", application Ser. No. 15/845,773, filed Dec. 18, 2017, now U.S. Pat. No. 10,374,979, issued Aug. 6, 2019, which application is a continuation of and claims priority to U.S. patent application titled "SYSTEM AND METHOD FOR SUPPORTING EFFICIENT LOAD-BALANCING IN A HIGH PERFORMANCE COMPUTING (HPC) ENVIRONMENT", application Ser. No. 14/792,070, filed on Jul. 6, 2015, now U.S. Pat. No. 9,876,737, issued Jan. 23, 2018, which claims the benefit of priority to U.S. Provisional application titled "SYSTEM AND METHOD FOR SUPPORTING EFFICIENT LOAD-BALANCING IN A HIGH-PERFORMANCE COMPUTING (HPC) ENVIRONMENT", Application No. 62/023,321, filed Jul. 11, 2014, and to U.S. Provisional application titled "SYSTEM AND METHOD FOR SUPPORTING EFFICIENT LOAD-BALANCING IN A HIGH-PERFORMANCE COMPUTING (HPC) ENVIRONMENT", Application No. 62/049,466, filed Sep. 12, 2014, which above applications are herein incorporated by reference.

FIELD OF INVENTION

The present invention is generally related to computer systems, and is particularly related to a network environment.

BACKGROUND

The fat-tree topology is used for high performance computing (HPC) clusters, and for clusters based on InfiniBand™ (IB) technology. For example, the fat-tree topology is used in the fastest supercomputers, such as Tianhe-2. Also, the fat-tree IB systems include large installations such as Stampede, TGCC Curie and SuperMUC.

These are the general areas that embodiments of the invention are intended to address.

SUMMARY

Described herein are systems and methods for supporting efficient load balancing among a plurality of switches and a plurality of end nodes arranged in a tree topology in a network environment. The systems and methods can sort the plurality of end nodes, the plurality of end nodes being on one or more leaf switches in the tree topology, wherein the plurality of end nodes are sorted in a decreasing order of a receive weight. The systems and methods can route, in decreasing order of receive weights, the plurality of end nodes, wherein the routing comprises selecting at least one down-going port and at least one up-going port. The systems and methods can increase an accumulated downward weight on each selected down-going port by the receive weight of the routed end node. Finally, the systems and methods can increase an accumulated upward weight on each selected up-going port by the receive weight of the routed end node.

In an embodiment, the systems and methods described herein can allow the plurality of switches and the plurality of end nodes to be in a fat-tree topology for use in a high-performance computing (HPC) cluster. Additionally, in an embodiment, the receive weights for the plurality of the end nodes on the one or more leaf switches can be received by the system.

In an embodiment, the selection performed by the methods and systems of the at least one down-going port can comprise comparing a plurality of down-going ports and selecting the down-going port having a least accumulated downward weight.

In an embodiment, the selection performed by the methods and systems of the at least one down-going port comprises comparing a plurality of down-going ports and selecting the down-going port having a least accumulated upward weight.

In an embodiment, the selection performed by the methods and systems of the at least one down-going port comprises comparing a plurality of down-going ports and selecting a down-going port having a smallest global unique identifier.

In an embodiment, the selection performed by the methods and systems of the at least one down-going port comprises comparing a plurality of down-going ports and selecting the down-going port have a least accumulated downward weight. When two or more down-going ports having the least accumulated downward weight, the methods and systems can further compare the two or more down-going ports having the least accumulated downward weight and select from the two or more down-going ports having the least accumulated downward weight the down-going port having a least accumulated upward weight. When the two or more down-going ports have the least accumulated downward weight and the least accumulated upward weight, the methods and systems can compare the two or more down-going ports having the least accumulated downward weight and the least accumulated upward weight, and select from the two or more down-going ports having the least accumulated downward weight and the least accumulated upward weight the down-going port having a smallest global unique identifier.

DETAILED DESCRIPTION

Figure 1:
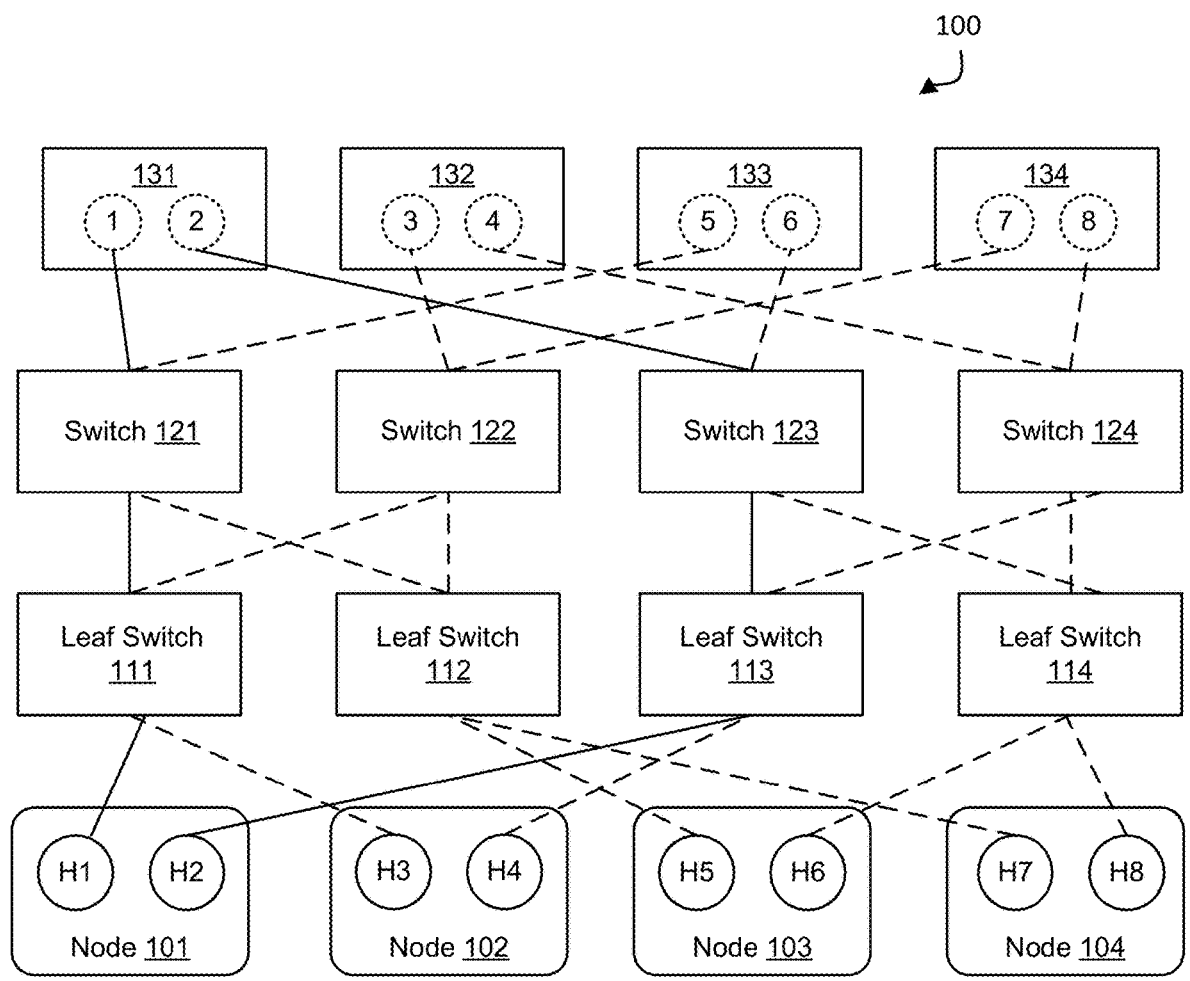
FIG. 1 is a block diagram of fat-tree routing in a network environment, in which an embodiment of the present invention can be practiced.

In the following detailed description, the invention will be illustrated by way of example and not by way of limitation in the figures of the accompanying drawings. It should be noted that references to "an" or "one" or "some" embodiment(s) in this disclosure are not necessarily to the same embodiment, and such references mean at least one. While specific implementations are discussed, it is understood that the specific implementations are provided for illustrative purposes only. A person skilled in the relevant art will recognize that other components and configures may be used without departing from the scope and spirit of the invention.

Common reference numerals are used to indicate like elements throughout the drawings and detailed description; therefore, reference numerals used in a figure may or may not be referenced in the detailed description specific to such figure if the element is described elsewhere.

The following description of the invention uses an Infiniband™ (IB) network as an example for a high performance network. It will be apparent to those skilled in the art that other types of high performance networks can be used without limitation. The following description also uses the fat-tree topology as an example for a fabric topology. It will be apparent to those skilled in the art that other types of fabric topologies can be used without limitation.

InfiniBand™

InfiniBand™ (IB) is an open standard lossless network technology developed by the InfiniBand™ Trade Association. The technology is based on a serial point-to-point full-duplex interconnect that offers high throughput and low latency communication, geared particularly towards HPC applications and datacenters.

The InfiniBand™ Architecture (IBA) supports a two-layer topological division. At the lower layer, IB networks are referred to as subnets, where a subnet can include a set of hosts interconnected using switches and point-to-point links. At the higher level, an IB fabric constitutes one or more subnets, which can be interconnected using routers.

Within a subnet, hosts are connected using switches and point-to-point links. Additionally, there is one master management entity, the subnet manager (SM), which resides on a designated subnet device in the subnet. The subnet manager is responsible for configuring, activating and maintaining the IB subnet. Additionally, the subnet manager (SM) can be responsible for performing routing table calculations in an IB fabric. Here, for example, the routing of the IB network aims at proper load balancing between all source and destination pairs in the local subnet.

Through the subnet management interface, the subnet manager exchanges control packets, which are referred to as subnet management packets (SMPs), with subnet management agents (SMAs). The subnet management agents reside on every IB subnet device. By using SMPs, the subnet manager is able to discover the fabric, configure end nodes and switches, and receive notifications from SMAs.

Generally, all other subnet managers, excepting the master subnet manager, act in standby mode for fault-tolerance. In a situation where a master subnet manager fails, however, a new master subnet manager is negotiated by the standby subnet managers. The master subnet manager also performs periodic sweeps of the subnet to detect any topology changes and reconfigure the network accordingly.

Furthermore, hosts and switches within a subnet can be addressed using local identifiers (LIDs), and a single subnet can be limited to 49151 LIDs. Besides the LIDs, which are the local addresses that are valid within a subnet, each IB device can have a 64-bit global unique identifier (GUID) that is burned into its non-volatile memory. A GUID can be used to form a global identifier (GID), which is an IB layer three (L3) address. A GID can be created by concatenating a 64-bit subnet identifier (ID) with the 64-bit GUID to form an IPv6-like 128-bit address. For example, different port GUIDs can be assigned to the ports connected to the IB fabric.

The SM can calculate routing tables (i.e., the connections/routes between each pair of nodes within the tree) at network initialization time. Furthermore, the routing tables can be updated whenever the topology changes, in order to ensure optimal performance. During normal operations, the SM can perform periodic light sweeps of the network to check for topology changes. If a change is discovered during a light sweep or if a message (trap) signaling a network change is received by the SM, the SM can reconfigure the network according to the discovered changes.

For example, the SM can reconfigure the network when the network topology changes, such as when a link goes down, when a device is added, or when a link is removed. The reconfiguration steps can include the steps performed during the network initialization. Furthermore, the reconfigurations can have a local scope that is limited to the subnets, in which the network changes occurred. Also, the segmenting of a large fabric with routers may limit the reconfiguration scope.

Fat-Tree Routing

The fat-tree topology is a scalable class of general-purpose network topologies. The initial idea behind fat-tree topology was to arrange the network topology as a layered, multi-rooted tree structure of switches with end nodes residing at the leaf switches. By the use of increasingly fatter links towards the roots of the fat-tree, full bisection bandwidth can be maintained and congestion is potentially avoided. This can additionally provide the benefit of using any bandwidth made available.

The fat-tree topology can provide various benefits for supporting high performance interconnections, for example, within HPC environments. These benefits can include deadlock freedom, inherent fault-tolerance, and full bisection bandwidth. The deadlock freedom represents the use of a tree structure makes it possible to route fat-trees without special considerations for deadlock avoidance. The inherent fault-tolerance that results from that the existence of multiple paths between individual source destination pairs allows for efficient handling of network faults. The full bisection bandwidth allows the network to sustain full speed communication between the two halves of the network.

Fat-tree routing algorithms can aim to generate linear forwarding tables (LFTs) that evenly spread shortest-path routes across the links in the network fabric. The algorithm can traverse the fabric in the indexing order and assign target LIDs of end nodes, and thus the corresponding routes, to each switch port.

Furthermore, fat-tree routing algorithms can be used to support the efficient use of the underlying fat-tree topology. The following Algorithm 1 is an exemplary fat-tree routing algorithm.

---
Algorithm 1 route_to_cns( ) function
---
Require: Addressing is completed
Ensure: All hca_ports are routed
1: for swleaf = 0 to max_leaf_sw do
2:   for swleaf.port = 0 to max_ports do
3:     hca_lid = swleaf.port-> remote_lid
4:     swleaf.routing table[hca_lid] = swleaf.port
5:     route_downgoing_by_going_up( )
6:   end for
7: end for

---

As shown in the above, the routing function, route_to_cns( ) can iterate over an array of leaf switches (Lines 1-7). For each selected leaf switch, the routing function can route each end-node port that is connected to the selected leaf switch, e.g. in the port numbering sequence (Lines 2-6).

Furthermore, when routing an end-node port that is associated with a particular LID, the routing function can go up one level in the network topology to route the down-going paths, and when routing each switch port, the routing function can go down to route the upgoing paths. This process can be repeated until the root switch level is reached. After that the paths towards all nodes can be routed and inserted into the linear forwarding tables (LFTs) of all switches in the fabric.

For example, the route_downgoing_by_going_up( ) function (Line 5) can be a recurrence function that can balance the paths and call the route_upgoing_by_going_down( ) function, which routes the upward paths in the fat-tree toward destination through the switch from which the route_downgoing_by_going_up( ) function was invoked.

There can be several potential drawbacks associated with the route_to_cns( ) function. First, the route_to_cns( ) function is oblivious and routes the end-ports without any consideration as to which end-node the end-ports belong. Second, the route_to_cns( ) function depends on the physical port number for routing.

FIG. 1 shows an illustration of fat-tree routing in a network environment, in which an embodiment of the present disclosure can be practiced. As shown in FIG. 1, one or more end nodes 101-104 can be connected in a network fabric 100. The network fabric 100 can be based on a fat-tree topology, which includes a plurality of leaf switches 111-114, and multiple spine switches or root switches 131-134. Additionally, the network fabric 100 can include one or more intermediate switches, such as switches 121-124.

Also as shown in FIG. 1, each of the end nodes 101-104 can be a multi-homed node, i.e. a single node that is connected to two or more parts of the network fabric 100 through multiple ports. For example, the node 101 can include the ports H1 and H2, the node 102 can include the ports H3 and H4, the node 103 can include the ports H5 and H6, and the node 104 can include the ports H7 and H8.

Additionally, each switch can have multiple switch ports. For example, the root switch 131 can have the switch ports 1-2, the root switch 132 can have the switch ports 3-4, the root switch 133 can have the switch ports 5-6, and the root switch 134 can have the switch ports 7-8.

Figure 2:
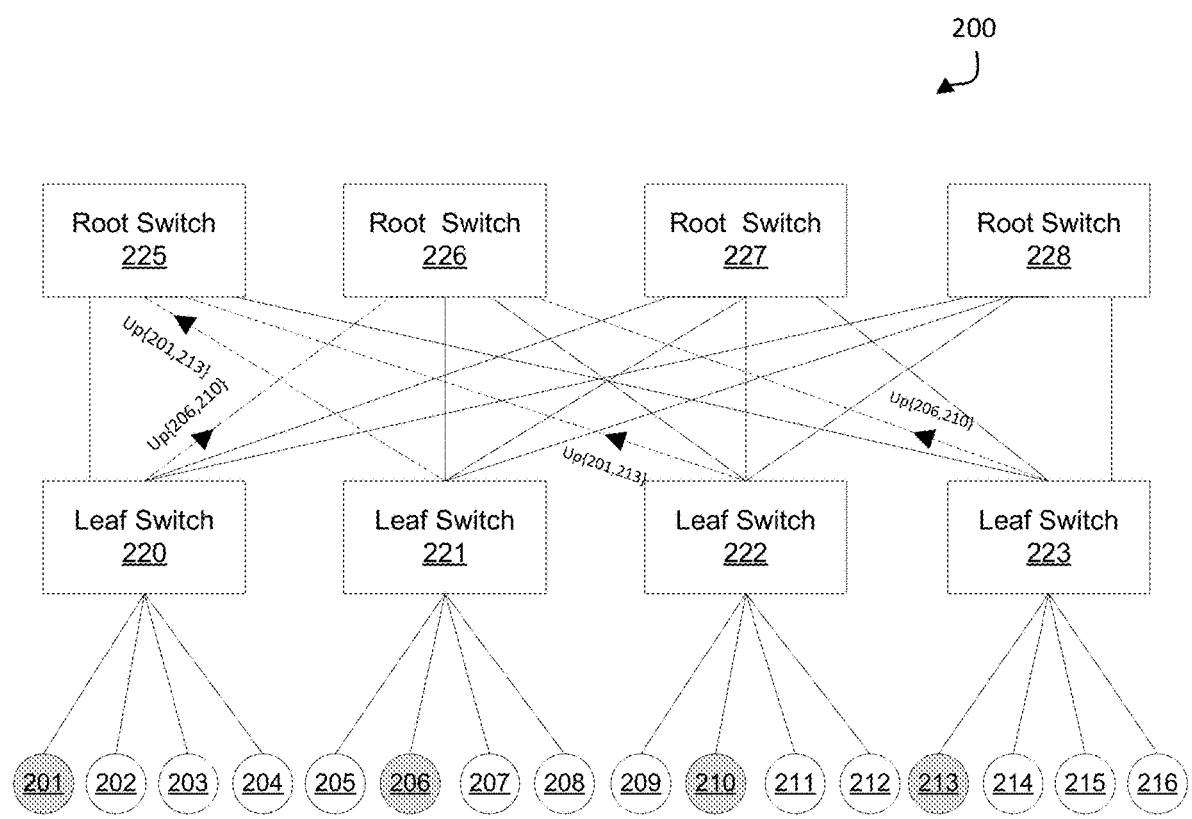
FIG. 2 is a block diagram of fat-tree routing in a network environment, in which an embodiment of the present invention can be practiced.

FIG. 2 shows an illustration of fat-tree routing in a network environment 200, in which an embodiment of the present disclosure can be practiced. FIG. 2 depicts a k-ary-n-tree, which is an n-level fat-tree with $k^n$ end nodes, and $n \times k^{n-1}$ switches, each with 2k ports. More specifically, FIG. 2 depicts a 4-ary-2-tree, i.e., the fat-tree topology has 2 levels, 16 end nodes (201-216), and 8 switches (four leaf switches 220-223 and four root switches 225-228), with each switch having 8 ports.

The legacy fat-tree routing algorithm (referred to variously herein as FTree) aims to generate LFTs that evenly spread shortest-path routes across the links in a network fabric. The algorithm generally traverses the fabric in the indexing order and assigns target LIDs of the end nodes, and thus the corresponding routes to each switch port. For the end nodes connected to the same leaf switch, the indexing order depends on the switch port to which the end node is connected (port numbering sequence). For each port, the algorithm can maintain a port usage counter and uses it to select the least-used port each time a route is added (if more than one option is available). If there are multiple ports connecting the same two switches, such ports form a port group. In that case, the least-used port of the least loaded port group is selected to add to a new route.

Generally, the port assignment to the LIDs is performed recursively in two stages, starting at the leaf switches. In the first stage, the algorithm traverses down from each end node up towards a tree root, allocating the down-going port to the LID. After the down-going ports are set, the algorithm assigns upward ports to the LID on all the connected downward switches by descending down the tree. The process is then repeated recursively by moving up to the next level of the tree.

There are two disadvantages associated with the legacy routing mechanism (i.e., the FTree algorithm) for fat-tree topology.

First, the load-balancing technique used by the standard algorithm for fat-tree topology seeks to balance the load across the links in the topology without taking any of the nodes' traffic characteristics into account. Stated differently, the legacy fat-tree algorithm assumes the same weight for all the nodes in the network. However, in HPC clusters, different nodes often have preassigned roles that determine their traffic profiles. For examples, storage nodes or I/O gateways are likely to consume more traffic than other nodes. Hence, routes towards these high traffic nodes are likely to be more congested and need priority in the network. When routing is done without taking into consideration the traffic needs of certain nodes, it can result in sub-optimal network throughput as some links are oversubscribed while alternative links are underutilized.

Second, the legacy algorithm for fat-tree topology is undesirable because it can result in non-predictable performance. This non-predictable performance results because the algorithm assigns routes to links according to the indexing order. The indexing order, however, is not configurable and depends on the port numbers of the leaf switches where the end nodes are connected. Because of this, fat-tree systems cabled in the same way may exhibit different and non-predictable performance. As an example, in a two-level fat-tree, if two end nodes at different leaf switches share the same index position, traffic towards those two nodes will be routed through the same root switch. As a result, all traffic headed for these two nodes, but originating from end nodes at the other leaf switches, will compete for access to a common set of upward links connected to a single root switch, even though several less loaded paths through alternative root switches may exist.

To better illustrate the issues with the legacy fat-tree routing algorithm, it is helpful to consider the routing of the example in FIG. 2. In FIG. 2, nodes 201, 206, 210, and 213 are shaded in order to represent four receiver nodes, or nodes that are known to receive a large fraction of the total network traffic. Each of the four leaf switches 220-223 is connected to four root switches 225-228. Assuming that the nodes are in indexing order from left to right (i.e., node 201 has an indexing order of 1, node 206 has an indexing order of 2, node 210 has an indexing order of 2, and node 213 has an indexing order of 1), this means that nodes 206 and 213 share the same indexing order (i.e., 1), and nodes 206 and 210 likewise share the same indexing order (i.e., 2). As a result of this, the fat tree-routing algorithm will route traffic towards these four end nodes using only the two leftmost root switches, 225 and 226. This results in four potentially oversubscribed links in the upward direction, shown by the dashed lines in FIG. 2. The dashed lines are labeled as "Up{a,b}" in FIG. 2 to indicate that the upward flow towards the receiver nodes a and b will compete for bandwidth on the links.

As an example, even though there are enough links available in the topology to avoid interference between traffic flows headed towards receiver node 201 and 213, the legacy fat-tree algorithm will still make the two independent flows to nodes 206 and 210 share the same upward link from the leftmost leaf switch 220.

Index Collision Probability for k-Ary-n-Trees

As discussed above, the performance of FTree can degrade if receiver nodes, that is nodes that account for a large fraction of the traffic within the system, in the network share index positions at their respective leaf switches. For example, in FIG. 2, receiver node 201 and receiver node 213 share the index position 1, and receiver node 206 and receiver node 210 share index position 2. Because of this, it is important to determine the probability of such index collisions (that is when receiver nodes share the same index position at different leaf switches) in order to assess the viability of FTree when it comes to load-balancing.

Recalling that a k-ary-n-tree is an n-level tree with $k^n$ end nodes, and $n \times k^{n-1}$ switches, each with 2k ports. Assuming a fully populated tree with end nodes and level l=n:

Each end node is represented by an n-tuple $\{0, 1, \ldots, k-1\}^n$ and each switch is represented by an order pair $\langle s, 1 \rangle$ where $s \in \{0, \ldots, k-1\}^{n-1}$ and level $l \in \{0, 1, \ldots, n-1\}$.

A leaf switch is defined as a level n−1 switch, $\langle l_0, l_1, \ldots, l_{n-2}, n-1 \rangle$, with an edge to end nodes $c_0, c_1, \ldots, c_{n-1}$ at level n.

In a situation where there are y nodes with, each of those y nodes having a higher proportion of the traffic reception in the network (e.g., receiver nodes), among the k end nodes at each leaf switch, the probability that a receiver node is found at any index position i at a leaf switch is given by the formula:

$$p_i = \frac{y}{k}$$

Because the fat-tree has $N=k^{n-1}$ leaf switches, a binomial distribution can be used to find the probability of the receiver nodes sharing the same index position at their corresponding switches. The probability to find exactly r receiver nodes at any index position i, with a probability of $p_i$ is given by:

$$f(r, N, p_i) = \binom{N}{r} p_i^r (1-p_i)^{N-r}$$

In order to calculate the probability of getting at least x index collisions at position i, a sum of all the corresponding probabilities is taken, as shown here:

$$f'(x, N, p_i) = \sum_{j=x+1}^{N} f(j, N, p_i), x < N$$

Note that for a fat-tree with R connected end nodes at each leaf switch, an index collision at any of the R positions, $i \in \{1, 2, 3, \ldots, R\}$, can result in increased network contention.

Weighted Fat-Tree Routing Algorithm

In accordance with an embodiment of the present disclosure, a weighted fat-tree routing algorithm (referred to variously throughout as wFatTree) is used in order to overcome the deficiencies of the above FTree. Within wFatTree, each end node is assigned a new parameter, receive_weight, which can be used to take known or learned traffic characteristics into account when calculating routes within the system.

In an embodiment, the value of receive weight parameter for each end node reflects the degree of the priority of the flows towards a node receive when calculating routing tables. As an example, a configuration could be to assign weights to the end nodes in the range [1,100]. Each node would receive a weight depending on how much traffic a node is known to receive in a network. In this example, an end node could be assigned a receive_weight of 1. This would represent a node that receives very little traffic (a traffic generating node). Additionally, an end node that receives traffic near the link capacity could be assigned a receive_weight of 100. In such a situation, values of receive_weight between 1 and 100 would then represent the proportion of the traffic a node receives in a network.

In another embodiment, a node could receive a receive_weight of 500, while all other nodes in the network are given a receive_weight of 1. This would indicate that the end node that has a receive_weight of 500 is a critical node, and that the traffic flowing towards the critical node should be prioritized.

In an embodiment, a wFatTree routing algorithm (shown below in Algorithm 2) works recursively in three phases. In this embodiment, all routes are calculated backwards, starting at the destination node and working in the reverse direction. The following Algorithm 2 is an exemplary wFatTree routing algorithm.

---
Algorithm 2 A wFatTree routing algorithm
---
```
 1: procedure ROUTETOENDNODES
 2:     for all s ∈ leafSwitches[ ] do
 3:         sort end nodes connected to s by rcv_weight
 4:         for all c ∈ endNodes[ ]do
 5:             s.LFT[c.LID]←c.port
 6:             ROUTEDOWNGOINGBYASC(s, c)
 7:         end for
 8:     end for
 9: end procedure
10: procedure ROUTEDOWNGOINGBYASC(s, c)
11:     p ← GETLEASTLOADEDPORT(s, UpGroups[ ])
12:     rSwitch ← p.Switch
13:     rSwitch.LFT[c.LID] ← p
14:     p.Dwn += c.rcv_weight
15:     ROUTEUPGOINGBYDESC(s, c)
16:     ROUTEDOWNGOINGBYASC(rSwitch, c)
17: end procedure
18: procedure ROUTEUPGOINGBYDESC(s, c)
19:     for all g ∈ DownGroups[ ] do
20:         skip g if the LFT(c.LID) is part of this group
21:         p ← GETLEASTLOADEDPORT(g)
22:         rSwitch ← p.Switch
23:         rSwitch.LFT[c.LID] ← p
24:         p.Up += c.rcv_weight
25:         ROUTEUPGOINGBYDESC(rSwitch, c)
26:     end for
27: end procedure
```
---

In an embodiment, during the first phase of exemplary Algorithm 2, the end nodes at each leaf switch are sorted according to decreasing receive weights (line 3). (Note that in Algorithm 2, receive_weight is abbreviated by "rcv_weight"). As mentioned previously, the receive weights can either be supplied by an administrator, or they can also be calculated. Further discussion of this topic appears later.

In an embodiment, during the second phase of exemplary Algorithm 2, wFatTree traverses up the tree from each end node (e.g., a destination node or the destination of a route), allocating the down-going port for the current node at the selected switch in the next level (ROUTEDOWGOINGBYASC, line 6 of exemplary Algorithm 2). When a down-going port is selected, the algorithm increases an accumulated downward weight for the corresponding port by the receive_weight of the routed end node (line 14). This marks that a new weighted route has been added to the corresponding port.

In an embodiment, after a down-going port is set, in the third phase of exemplary Algorithm 2, the algorithm assigns upward ports for routes towards the end node (and updates the corresponding upward weights for the ports by adding the receive_weight of the routed end nodes) on all the connected downward switches by descending down the tree (ROUTEUPGOINGBYDESC). The entire three-phase process is then repeated by moving up to the next level in the tree (line 16).

In an embodiment, an algorithm, which is a wFatTree algorithm, selects the least-loaded port for each route calculation. The selection criteria is firstly based on the downward weight. In a situation where two ports have equal downward weights, the port with the least upward weight is selected. Additionally, in a situation where both the downward and upward weights are equal, the algorithm selects the port with the smallest GUID to keep the process deterministic. The following exemplary Algorithm 3 shows how wFatTree selects the least loaded port for each route calculation:

---
Algorithm 3 Get least-loaded port of all port groups
---
```
 1: procedure GETLEASLOADEDPORT(PortGroups[ ])
 2:     min ← null
 3:     for all g ∈ PortGroups[ ]do
 4:         for all port ∈ g.Ports[ ] do
 5:             if port.Dwn < min.Dwn then
 6:                 min ← port
 7:             else if port.Dwn = min.Dwn then
 8:                 if port. Up < min. Up then
 9:                     min ← port
10:                 else if port. Up = min. Up
11:                     if port.GUID < min.GUID then
12:                         min ← port
13:                     end if
14:                 end if
15:             end if
16:         end for
17:     end for
18: end procedure
```
---

In an embodiment, wFatTree improves on the legacy FTree routing algorithm in several ways. First, unlike FTree, which, as mentioned above, is based on the indexing of nodes in the network, wherein each node at a leaf switch is indexed, wFatTree routes nodes in an order of decreasing receive weights. This allows for nodes that are, for example, receiver nodes (e.g., nodes with a large proportion of traffic within the system) to be routed first. Additionally, in the situation where a downward port at a switch is assigned to an end node, wFatTree updates an upward weight on the other local links associated with the node. This allows for the upward weight to be considered when selecting links because the upward links potentially carry traffic towards that node. Finally, in a situation where a least-used downward port is selected, after checking the downward weight, wFatTree also checks the upward weight assigned for selecting the least-contested port. This provides the benefit of improved load-balancing over legacy FTree which only checks the number of links routed in the downward direction. Upon finding that the number of downward links to be the same, legacy FTree reverts to the order of indexing to determine routing.

Figure 3:
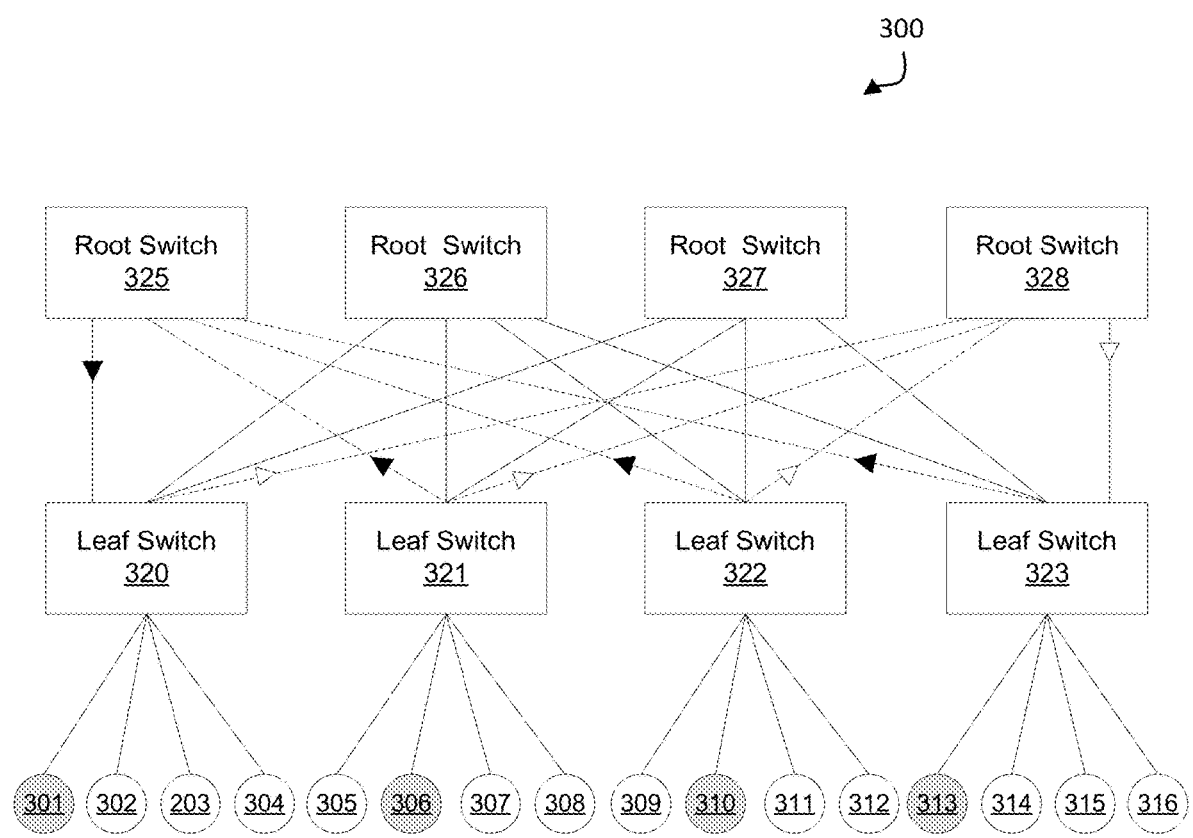
FIG. 3 is a block diagram of fat-tree routing in a network environment, in which an embodiment of the present invention can be practiced.

Referring now to FIG. 3, which depicts fat-tree routing in a network environment, in which an embodiment of the present disclosure can be practiced. The network environment 300, which is depicted as a k-ary-n-tree, which is an n-level fat-tree with $k^n$ end nodes, and $n \times k^{n-1}$ switches, each with 2k ports. Similar to FIG. 2, the highlighted nodes 301, 306, 310 and 313 are designated as receiver nodes as, for example, these nodes carry a large fraction of the total network traffic. In the embodiment depicted in FIG. 3, a wFatTree routing algorithm is used. As a result of the wFatTree routing algorithm, the network environment now considers each node's receive_weight when calculating routes.

In an embodiment, as shown in FIG. 3, upward traffic flowing to receiver node 301, the upward traffic being represented by a dashed line having a filled arrow indicating direction, entirely passes through root switch 325. Then, the downward route to receiver node 301, which is represented by the solid line with the filled arrow, flows from root switch 325 through leaf switch 320. Similarly, upward traffic destined for receiver node 313, the upward traffic being represented by a dashed line having open arrows indicating direction, entirely passes through root switch 328, before being routed down to leaf switch 323. In an embodiment, similar traffic patterns are also present for traffic flowing to receiver nodes 306 and 310.

The wFatTree routing algorithm employed in FIG. 3 demonstrates improved distribution onto the available links within the network environment 300. This allows for improved performance in the network over a network using legacy FTree.

In an embodiment, when a downward port at a switch is selected for a route toward an end node, all the incoming traffic to the switch headed for the end node is routed through the selected port. In particular, if all links are full-duplex, all other upward links connected to the switch are potentially carrying traffic, headed for the end node in question, in the upward direction. After setting the downward weight of the selected port, wFatTree marks all available upward links with the receive_weight of the node routed to. In a situation where multiple downward ports having the same downward load are available, when selecting the next downward part for a route, the port with the least upward weight is selected. To base the selection on both the downward weight and the upward weight ensures that the links in the network are balanced according to the receive weights of the end nodes.

Figure 4:
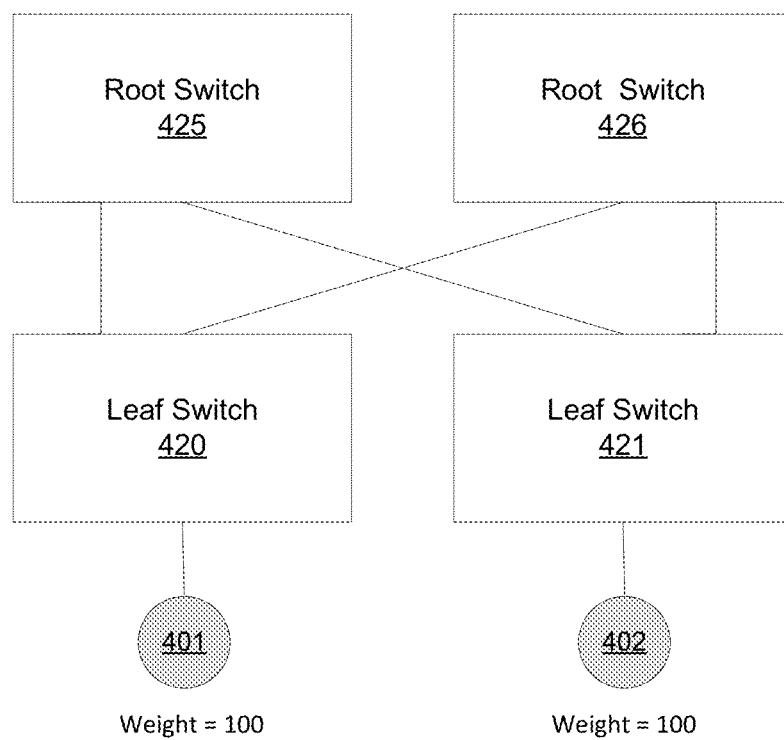
FIG. 4 is a block diagram showing an exemplary port selection within a network environment, according to an embodiment of the present invention.

FIG. 4 depicts an exemplary port selection within a network environment, according to an embodiment. The network environment depicted in FIG. 4 includes leaf switches 420 and 421, root switches 425 and 426, and end nodes 401 and 402. Throughout the discussion of FIGS. 4-9, it will be assumed the network environment is utilizing a wFatTree algorithm, and that both end node 401 and end node 402 have the same indexing position at their respective leaf switches, as well as the same receive weight of 100 (i.e., receive_weight=100 for both end node 401 and end node 402).

Figure 5:
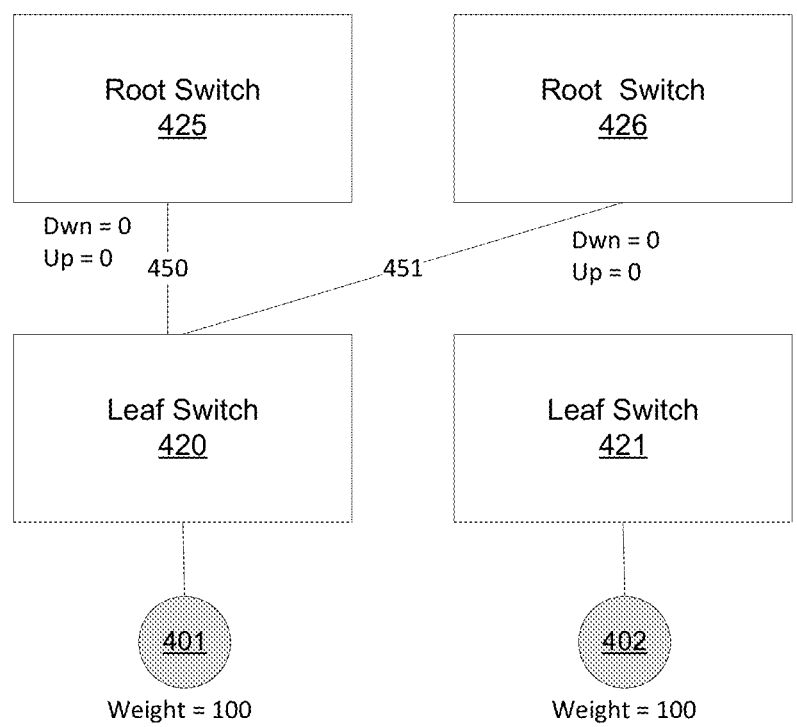
FIG. 5 is a block diagram showing an exemplary port selection within a network environment, according to an embodiment of the present invention.

FIG. 5 depicts an exemplary port selection within a network environment, according to an embodiment. The network environment depicted in FIG. 5 includes leaf switches 420 and 421, root switches 425 and 426, and end nodes 401 and 402. FIG. 5 shows that, when calculating routes towards end node 401, two upstream ports, links 450 and 451 with the same downward weights are available on the two different root switches, 425 and 426. In the depicted embodiment, there is no weight in the upward direction depicted yet, and there is also, as of yet, no weight in the downward direction. Thus, the weight on link 450 is: Up=0, Down=0. Likewise, the weight on link 451 is: Up=0, Down=0.

Figure 6:
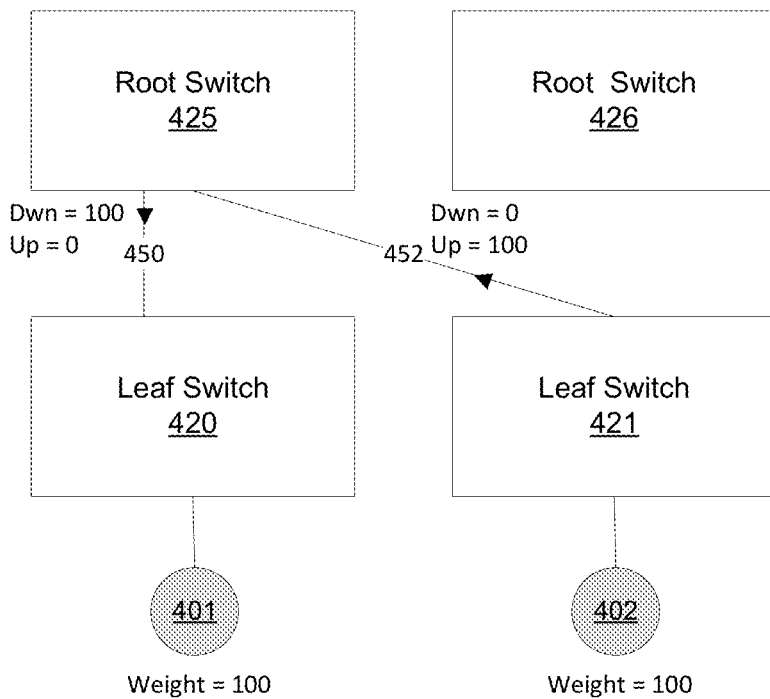
FIG. 6 is a block diagram showing an exemplary port selection within a network environment, according to an embodiment of the present invention.

FIG. 6 depicts an exemplary port selection within a network environment, according to an embodiment. The network environment depicted in FIG. 6 includes leaf switches 420 and 421, root switches 425 and 426, and end nodes 401 and 402. As depicted in FIG. 6, because there was no weight in the downward or upward direction yet, the port on the leftmost root switch, 425, is selected as it carries the smaller GUID. Because of this, link 450 thus carries the receive_weight of end node 401 in the down direction. Thus, the weight on link 450 is: Up=0, Down=100. Additionally, link 452 carries the receive_weight of end node 401 in the upward direction. Thus, the weight on link 452 is: Up=100, Down=0.

Figure 7:
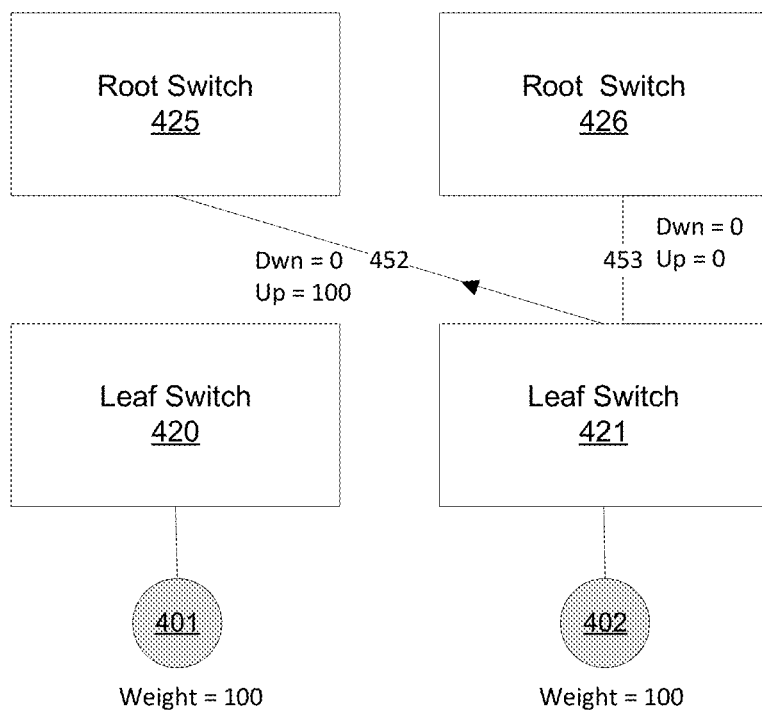
FIG. 7 is a block diagram showing an exemplary port selection within a network environment, according to an embodiment of the present invention.

FIG. 7 depicts an exemplary port selection within a network environment, according to an embodiment. The network environment depicted in FIG. 7 includes leaf switches 420 and 421, root switches 425 and 426, and end nodes 401 and 402. As depicted in FIG. 7, which is similar to FIG. 5, the route to end node 402 is being calculated. As shown in FIG. 5, there are two upstream ports with the same downward weight. Both links, 452 and 453, have an equal downward weight, namely 0. However, link 452 has an upward weight of 100, while link 453 has an upward weight of 0. This means that the upward weight of 453 is less than the upward weight of 452. As discussed above, when two links have the same downward weight, if one link has a larger upward weight than another link, then the algorithm will select the port with the smaller upward weight to route down.

Figure 8:
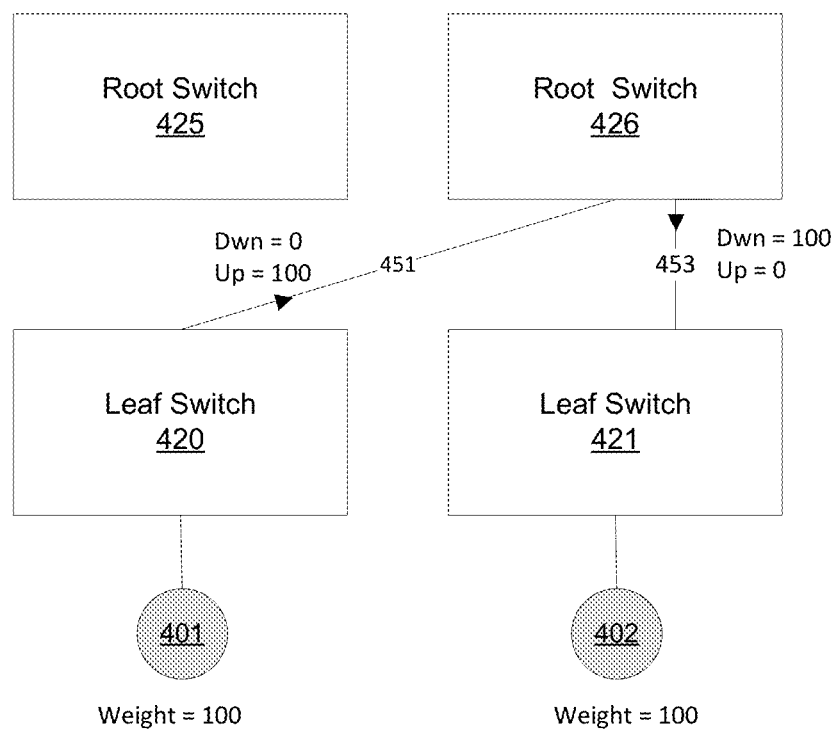
FIG. 8 is a block diagram showing an exemplary port selection within a network environment, according to an embodiment of the present invention.

FIG. 8 depicts an exemplary port selection within a network environment, according to an embodiment. The network environment depicted in FIG. 8 includes leaf switches 420 and 421, root switches 425 and 426, and end nodes 401 and 402. As depicted in FIG. 8, because the upward weight on link 452 (see FIG. 7) was greater than the upward weight on link 453, link 453 is selected to carry down to node 402. As a result, link 453 thus carries the receive_weight of end node 402 in the down direction. Thus, the weight on link 453 is: Up=0, Down=100. Additionally, as discussed above, link 451 carries the receive_weight of end node 402 in the upward direction. Thus, the weight on link 451 is: Up=100, Down=0.

Figure 9:
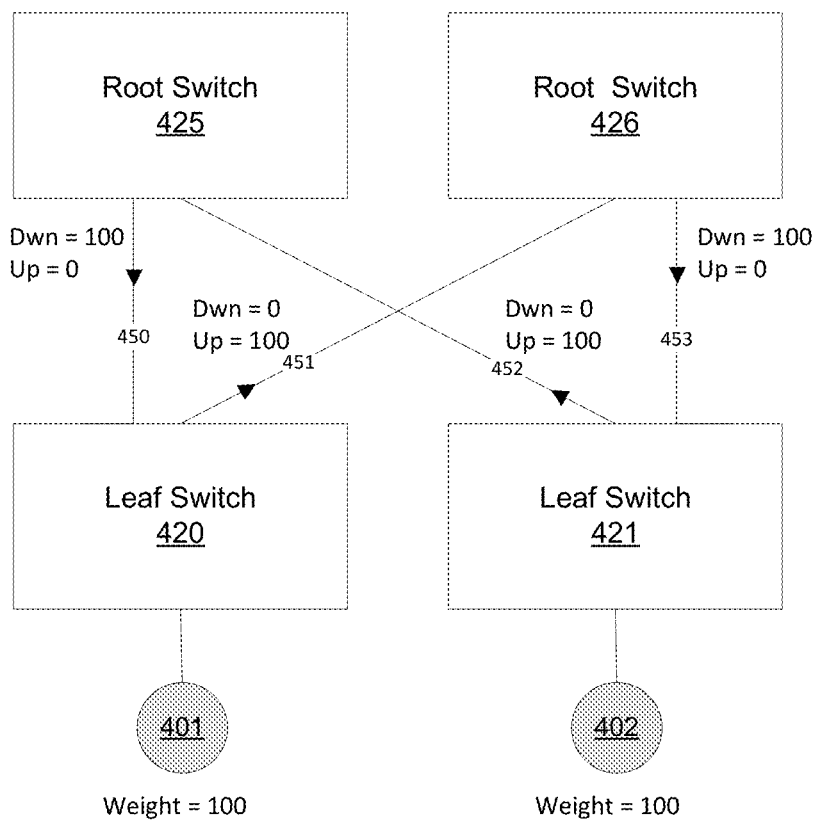
FIG. 9 is a block diagram showing an exemplary port selection within a network environment, according to an embodiment of the present invention.

FIG. 9 depicts an exemplary port selection within a network environment, according to an embodiment. The network environment depicted in FIG. 9 includes leaf switches 420 and 421, root switches 425 and 426, and end nodes 401 and 402. FIG. 9 depicts the final routing, after all the link weights are updated. In particular, it will be noted that the routes to end nodes 401 and 402 are well balanced, utilizing the available links in the topology, even though the two receiver nodes share the same indexing position at their respective leaf switches.

Figure 10:
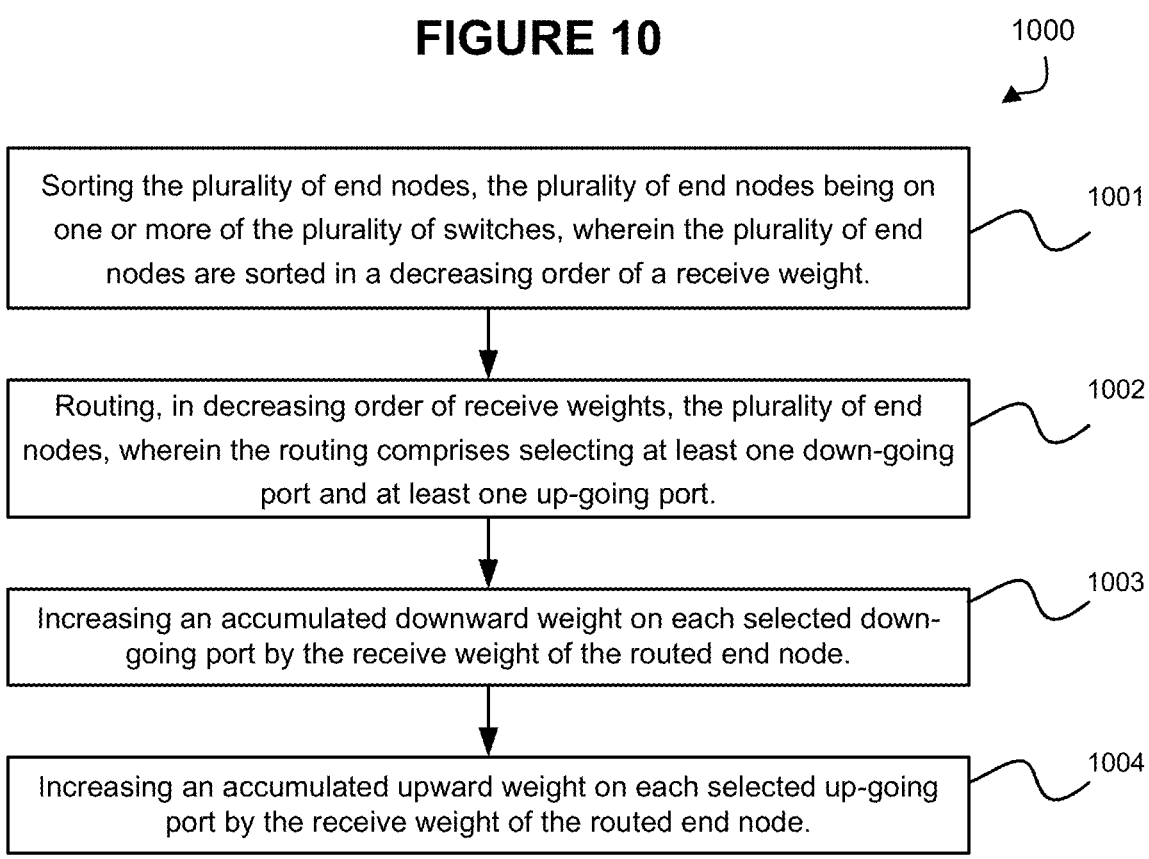
FIG. 10 is a flow chart showing a method for supporting efficient load balancing among a plurality of switches and a plurality of end nodes arranged in a tree topology in a network environment, according to an embodiment of the present invention.

FIG. 10 depicts, via a flow chart, an exemplary method 1000 for supporting efficient load balancing among a plurality of switches and a plurality of end nodes arranged in a tree topology in a network environment. At step 1001, the exemplary method 1000 begins with sorting the plurality of end nodes, the plurality of end nodes being on one or more of the plurality of switches, wherein the plurality of end nodes are sorted in a decreasing order of a receive weight. In an embodiment, the receive weight of an end node can be a value between 1 and 100, or another suitable range, where the larger the value of a receive weight represents the respective node having a proportionally larger share of the traffic in the network over nodes with smaller receive weights.

At step 1002, the exemplary method 1000 continues with routing, in decreasing order of receive weights, the plurality of end nodes, wherein the routing comprises selecting at least one down-going port and at least one up-going port. By routing in decreasing order, this allows for the network to prioritize traffic to end nodes that receiver a higher volume of traffic and decrease the likelihood of port collisions. In some embodiments, the selecting is based upon the respective receive weights.

At step 1003, the exemplary method 1000 can proceed with increasing an accumulated downward weight on each selected down-going port by the receive weight of the routed end node.

At step 1004, the exemplary method 1000 can continue with increasing an accumulated upward weight on each selected up-going port by the receive weight of the routed end node.

Calculating Receive_Weights

In an embodiment, when administrative information about the nodes is not available, and more particularly the nodes' receive_weights, and is not supplied or otherwise available, the receive_weights can be calculated. In embodiments utilizing OFED (OpenFabrics Enterprise Distribution), a utility called ibdatacounts is provided for reading data counters. After setting up the network and giving each node equal receive_weights, new weights can be calculated, or learned after a specified period of time.

In an embodiment, if B is the set of receive bandwidths for all nodes measured over a time period, the weight for each node can be assigned in a range [a, b] by using a linear transformation, as given in this exemplary equation:

$$W(x) = (x-a)\frac{b-a}{\max(B)-\min(B)} + a, \forall x \in B$$

In an embodiment, once a new set of weights have been acquired from the data counters, the network can be reconfigured with the optimized routing tables. Note, however, that, in an embodiment, a balancing test may be performed that balances the benefits of reconfiguring the routing tables to be optimized versus the downtime that such reconfiguration will require. A reconfiguration of the routing tables, in an embodiment, can be put off until such time as the reconfiguration is induced by an external factor, such as a topology change.

As those of ordinary skill in the art will understand, the functions represented by the block diagram may be performed by software and/or hardware. Depending upon the particular processing strategy, such as event-driven, interrupt-driven, etc., the various functions may be performed in an order or sequence other than illustrated in the Figure. Similarly, one or more steps or functions may be repeatedly performed, although not explicitly illustrated. Likewise, various functions may be omitted depending on the particular implementation. Various functions known to those of skill in the art may not be explicitly illustrated or described, but are implied by the illustrated blocks or modules. In one embodiment, the functions illustrated are primarily performed by control logic implemented by software, instructions, or code stored in a computer readable storage medium and executed by a microprocessor-based controller to control operation of the system. While generally illustrated and described with respect to a magnetic tape drive, those of ordinary skill in the art will recognize that various functions may be applicable to various other types of peripheral storage devices The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed:

1. A method for supporting efficient load balancing among a in a high performance computing environment, comprising:
    calculating a receive weight for at least two end nodes of a plurality of end nodes within a subnet;
    assigning a down-going port, of a plurality of down-going ports at a switch of the subnet, to each of the at least two end nodes, wherein each down-going port is associated with an initial downward weight;
    wherein the assignment of down-going ports to each of the at least two end nodes takes place in an order, the order being based upon the calculated receive weight of the at least two end nodes.

2. The method of claim 1,
    wherein calculating the receive weight for the at least two end nodes comprises:
        setting a same initial receive weight at each of the at least two end nodes;
        monitoring traffic flow to each of the at least two end nodes; and
        based on a ratio of traffic between each of the at least two end nodes,
    determining the calculated receive weight for each of the at least two end nodes.

3. The method of claim 2,
    wherein a data counter utility performs the monitoring traffic flow to each of the at least two end nodes.

4. The method of claim 2,
    wherein each calculated receive weight corresponds to a proportion of traffic each of the plurality of end nodes receive within the subnet.

5. The method of claim 1,
    wherein upon assigning a down-going port to an end node of the at least two end nodes, the downward weight of the down-going port is increased by the calculated receive weight of the assigned end node.

6. The method of claim 5, further comprising:
    assigning an up-going port of a plurality of up-going ports at the switch, to the end node of the at least two end nodes, wherein each up-going port is associated with an upward weight.

7. The method of claim 6,
    wherein upon assigning the up-going port to the end node of the at least two end nodes, the upward weight of the up-going port is increased by the weight of the assigned end node.

8. A system for supporting efficient load balancing in a high performance computing environment, the system comprising:
one or more microprocessors; and
a processor, running on the one or more microprocessors, wherein the processor operates to perform steps comprising:
calculate a receive weight for at least two end nodes of a plurality of end nodes within a subnet, and
assign a down-going port, of a plurality of down-going ports at a switch of the subnet, to each of the at least two end nodes, wherein each down-going port is associated with an initial downward weight;
wherein the assignment of down-going ports to each of the at least two end nodes takes place in an order, the order being based upon the calculated receive weight of the at least two end nodes.

9. The system of claim 8,
wherein calculating the receive weight for the at least two end nodes comprises:
setting a same initial receive weight at each of the at least two end nodes;
monitoring traffic flow to each of the at least two end nodes; and
based on a ratio of traffic between each of the at least two end nodes,
determining the calculated receive weight for each of the at least two end nodes.

10. The system of claim 9,
wherein a data counter utility performs the monitoring traffic flow to each of the at least two end nodes.

11. The system of claim 9,
wherein each calculated receive weight corresponds to a proportion of traffic each of the plurality of end nodes receive within the subnet.

12. The system of claim 8,
wherein upon assigning a down-going port to an end node of the at least two end nodes, the downward weight of the down-going port is increased by the calculated receive weight of the assigned end node.

13. The system of claim 12, the steps further comprising:
assign an up-going port of a plurality of up-going ports at the switch, to the end node of the at least two end nodes, wherein each up-going port is associated with an upward weight.

14. The system of claim 13,
wherein upon assigning the up-going port to the end node of the at least two end nodes, the upward weight of the up-going port is increased by the weight of the assigned end node.

15. A non-transitory machine readable storage medium having instructions stored thereon for method for supporting efficient load balancing among a in a high performance computing environment that when executed cause a system to perform steps comprising:
calculating a receive weight for at least two end nodes of a plurality of end nodes within a subnet;
assigning a down-going port, of a plurality of down-going ports at a switch of the subnet, to each of the at least two end nodes, wherein each down-going port is associated with an initial downward weight;
wherein the assignment of down-going ports to each of the at least two end nodes takes place in an order, the order being based upon the calculated receive weight of the at least two end nodes.

16. The non-transitory machine readable storage medium of claim 15,
wherein calculating the receive weight for the at least two end nodes comprises:
setting a same initial receive weight at each of the at least two end nodes;
monitoring traffic flow to each of the at least two end nodes; and
based on a ratio of traffic between each of the at least two end nodes,
determining the calculated receive weight for each of the at least two end nodes.

17. The non-transitory machine readable storage medium of claim 16,
wherein a data counter utility performs the monitoring traffic flow to each of the at least two end nodes.

18. The non-transitory machine readable storage medium of claim 16,
wherein each calculated receive weight corresponds to a proportion of traffic each of the plurality of end nodes receive within the subnet.

19. The non-transitory machine readable storage medium of claim 15,
wherein upon assigning a down-going port to an end node of the at least two end nodes, the downward weight of the down-going port is increased by the calculated receive weight of the assigned end node.

20. The non-transitory machine readable storage medium of claim 19, the steps further comprising:
assigning an up-going port of a plurality of up-going ports at the switch, to the end node of the at least two end nodes, wherein each up-going port is associated with an upward weight.

\* \* \* \* \*